US006256890B1

(12) United States Patent
Schliemann et al.

(10) Patent No.: US 6,256,890 B1
(45) Date of Patent: Jul. 10, 2001

(54) MOUNTING MECHANISM FOR AN ADJUSTABLE COMPONENT THAT IS TO BE HELD

(75) Inventors: Harald Schliemann, Waiblingen; Manfred Rabis, Schorndorf; Hans Nickel, Cottenweiler, all of (DE)

(73) Assignee: Firma Andreas Stihl AG & Co. (DE)

( * ) Notice: Subject to any disclaimer, the term of this patent is extended or adjusted under 35 U.S.C. 154(b) by 0 days.

(21) Appl. No.: 09/350,400

(22) Filed: Jul. 8, 1999

(30) Foreign Application Priority Data

Jul. 8, 1998 (DE) .......................................... 298 12 098 U

(51) Int. Cl.[7] .................................................... B23D 57/02

(52) U.S. Cl. ............................... 30/386; 30/383; 411/500; 411/538

(58) Field of Search ...................... 30/386, 383; 411/500, 411/537, 538

(56) References Cited

U.S. PATENT DOCUMENTS 3,171,518 * 3/1965 Bergmann ............................ 411/500
3,327,741 * 6/1967 Merz ...................................... 30/386
4,293,263 * 10/1981 Zankl .................................. 411/500
5,862,600 * 1/1999 Leini et al. ............................ 30/386

FOREIGN PATENT DOCUMENTS 25 09 518 9/1976 (DE) .

* cited by examiner

*Primary Examiner*—Douglas D. Watts
(74) *Attorney, Agent, or Firm*—Robert W. Becker & Associates

(57) ABSTRACT

A mounting mechanism for an adjustable component that is to be held against an abutment surface of a housing, especially for the guide bar of a power chain saw, is provided. The mechanism includes at least two bolts that are provided on the housing, are spaced from one another, and project beyond the abutment surface of the housing and into an elongated opening of the component. At least one device is provided that extends into a gap between one of the bolts and at least one of the longitudinal edges of the elongated opening for engaging such at least one longitudinal edge.

17 Claims, 4 Drawing Sheets

MOUNTING MECHANISM FOR AN ADJUSTABLE COMPONENT THAT IS TO BE HELD

BACKGROUND OF THE INVENTION

The present invention relates to a mounting mechanism for an adjustable component that is to be held, especially for the guide bar of a power chain saw. The component is adapted to be held against an abutment surface of a housing.

DE 25 09 518 A1 discloses the arresting of a guide bar or rail on motor driven hand saws, especially power chain saw, whereby the sword-shaped guide rail is provided with a guide groove that extends in the longitudinal direction. This guide rail can be secured relative to an abutment transverse to the plane of the rail. The guide rail is furthermore associated with a counter guide that cooperates with the sides of the guide groove and that is formed by at least one support element for at least one of the groove sides. When the rail is secured against the abutment, for example the motor housing, this support element is automatically securable in abutment against the groove side. The support element can be a swivel bar, a swivel lever, or a spring element.

With the known arrangement the support element is disposed between two bolts provided for screwing on tightening nuts and is hence disposed approximately in the middle of the guide groove. As a result, the support element forms merely one defined abutment point on the side of the guide groove, whereby the support points required on the opposite side of the guide groove respectively result from the shaft of the bolts for receiving the tightening nuts. Since the support elements can compensate only for a slight tolerance transverse to the longitudinal axis of the guide groove, not only the width of the guide groove but also a radial shoulder on the bolts for receiving the tightening nuts must be manufactured with relatively close tolerances in order to always ensure an abutment without play against the side of the guide groove.

It is therefore an object of the present invention to provide a mounting mechanism of the aforementioned general type that is simpler in construction and can compensate greater tolerances with respect to the opening in the component.

BRIEF DESCRIPTION OF THE DRAWINGS

This object, and other objects and advantages of the present invention, will appear more clearly from the following specification in conjunction with accompanying schematic drawings, in which.

SUMMARY OF THE INVENTION

Figure 1:
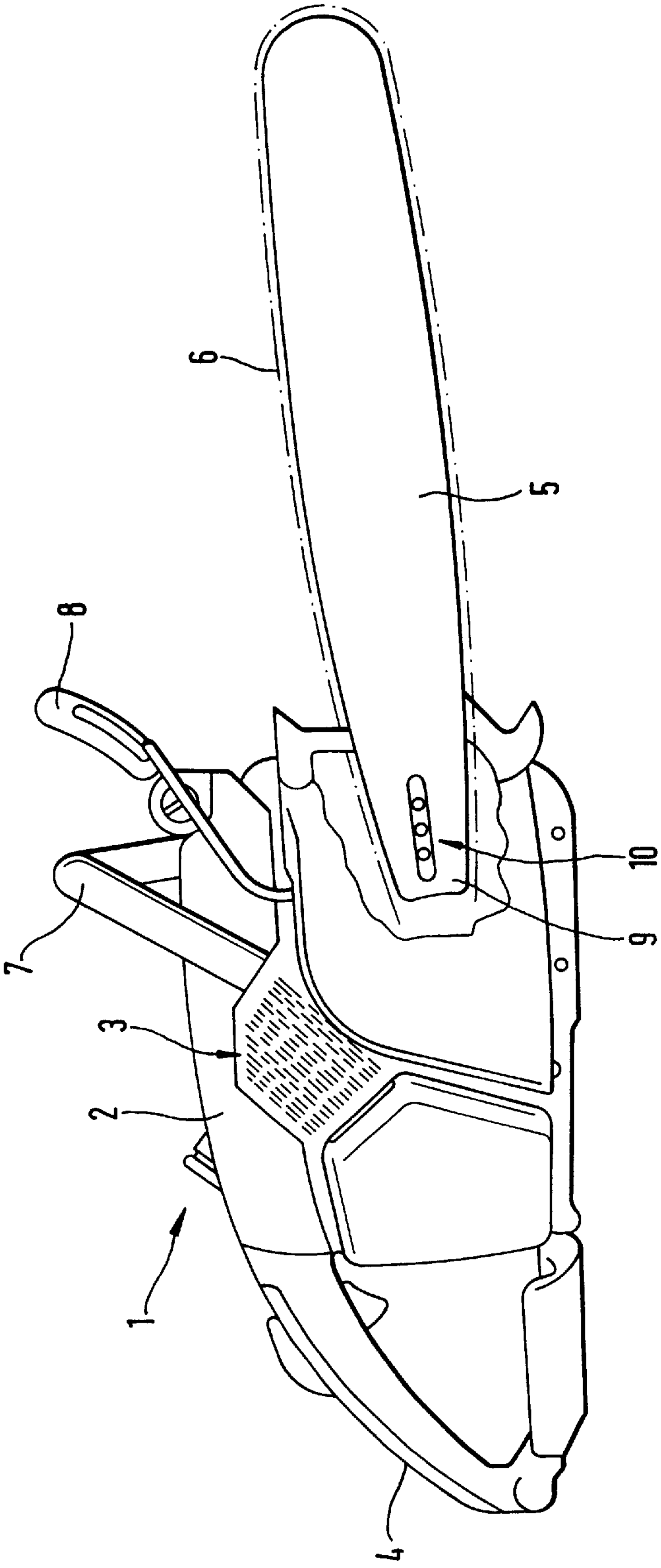
FIG. 1 schematically illustrates a power chain saw with a guide bar for a saw chain mounted on the housing of the power chain saw.

The mounting mechanism of the present invention is characterized primarily by at least two bolts that are provided on the housing, are spaced from one another and project beyond the abutment surface of the housing and into an elongated opening of the component, and by at least one means that extends into a gap between one of the bolts and at least one of the longitudinal edges of the elongated opening for engaging such at least one longitudinal edge.

The essential advantages of the present invention are that the means for compensating the dimensional tolerances are not susceptible to becoming clogged and due to their shape offer the possibility of also being able to compensate for alternations in the dimensions caused by wear.

The bolts are preferably screws that are received in threaded bores of the housing. It is particularly expedient if the means for compensating the dimensional gap between the edge of the elongated opening and the bolt is a sleeve or collar that is disposed in the opening, and the outer cross-sectional shape of which in at least one dimension is greater than the width of the elongated opening. It is particularly advantageous to form the outer surfaces of the collar from two circular arc sections having preferably equal radii and two parallel chords of the circle that extend between the arcs.

If the collar is configured in this manner, it has the advantage that upon rotation about the collar axis, it comes to rest against both edges of the elongated opening, so that an absolutely play-free support against both longitudinal edges of the opening is achieved by a single component, namely the collar. In order to bring the collar into contact against the edges of the elongated opening, means are provided for the positive or frictional connection of the bolt and sleeve in the direction of rotation of the bolt. These means work by carrying along the collar in the direction of rotation by rotating the bolt until contact against the edges of the elongated opening is achieved, and subsequently a limited further rotation of the bolt is still possible in order to fix the collar in this rotational position. In this connection, it is particularly expedient to provide a respective conical section in a bore of the collar and on the bolt, with the cone angles being coordinated with one another.

A further bolt is expediently provided between the spaced-apart bolts for the means for compensating for the tolerances. This further bolt projects through the component that is to be held, and on its free end has a threaded portion upon which can be screwed the tightening element that fixes the component against the abutment surface of the housing. So that the abutment of this tightening element against the surface of the component is possible independent of the shape of the tightening element, no projections should extend out of the plane of the component, for example the guide bar. It is therefore advantageous that the cone on the bolt be formed on the head of the bolt so that this head is disposed within the collar and the axial length of the bolt head corresponds approximately to the axial length of the collar. In this way, the collar and bolt head are flush and do not exceed the thickness of the guide bar. To rotate the bolt, a hexagonal recess is provided in the bolt head into which can be inserted an Allen wrench. So that the shape of the collar can be maintained regardless of how frequently and how long it is used, and so that is does not undergo wear, it is expedient for the collar to be made out of very hard carbon steel.

Depending upon the material of the housing, a metal plate is provided on the abutment surface of the housing for supporting the component. This metal plate is provided with an opening through which extends the bolt or its head. If such a metal plate is present, the means for compensating for the tolerances can be formed by a section of the metal plate that is disposed on the rim of the opening and extends at an angle to the longitudinal axis of the bolt. In this way, the leading end of this section extends into the gap between the head of the bolt and the longitudinal edge of the opening in the guide bar. As an alternative, it is also possible for the head of the bolt to have an essentially circular cross-sectional shape and to be provided on the outer surface over a portion of the periphery with a radially widened portion having a surface that extends at an angle to the longitudinal axis. Not only with an inclined section of the metal plate but also with the described radially widened portion of the bolt head, when the guide bar is pressed against the metal plate or the abutment of the housing, the opening of the guide bar is brought into a position in which the two longitudinal edges of the elongated opening are held without play against support points of the bolt head or of the plate.

Further specific features of the present invention will be described in detail subsequently.

DESCRIPTION OF PREFERRED EMBODIMENTS

Referring now to the drawings in detail, FIG. 1 is a schematic side view of a power chain saw 1, which comprises a housing 2 in which is accommodated an internal combustion engine 3, and a guide bar 5 that is secured to the housing 2 and is provided for a saw chain 6. Furthermore, disposed on the housing 2 is a rear handle 4, a forward handle 7, and a hand guard 8. The rear end 9 of the guide bar 5 is secured to the housing 2, whereby a mounting mechanism 10 is provided that has means for adjustment in the longitudinal direction of the guide bar 5 and for holding the after in position on the housing; to facilitate illustration, such means are not shown in detail in FIG. 1.

Figure 2:
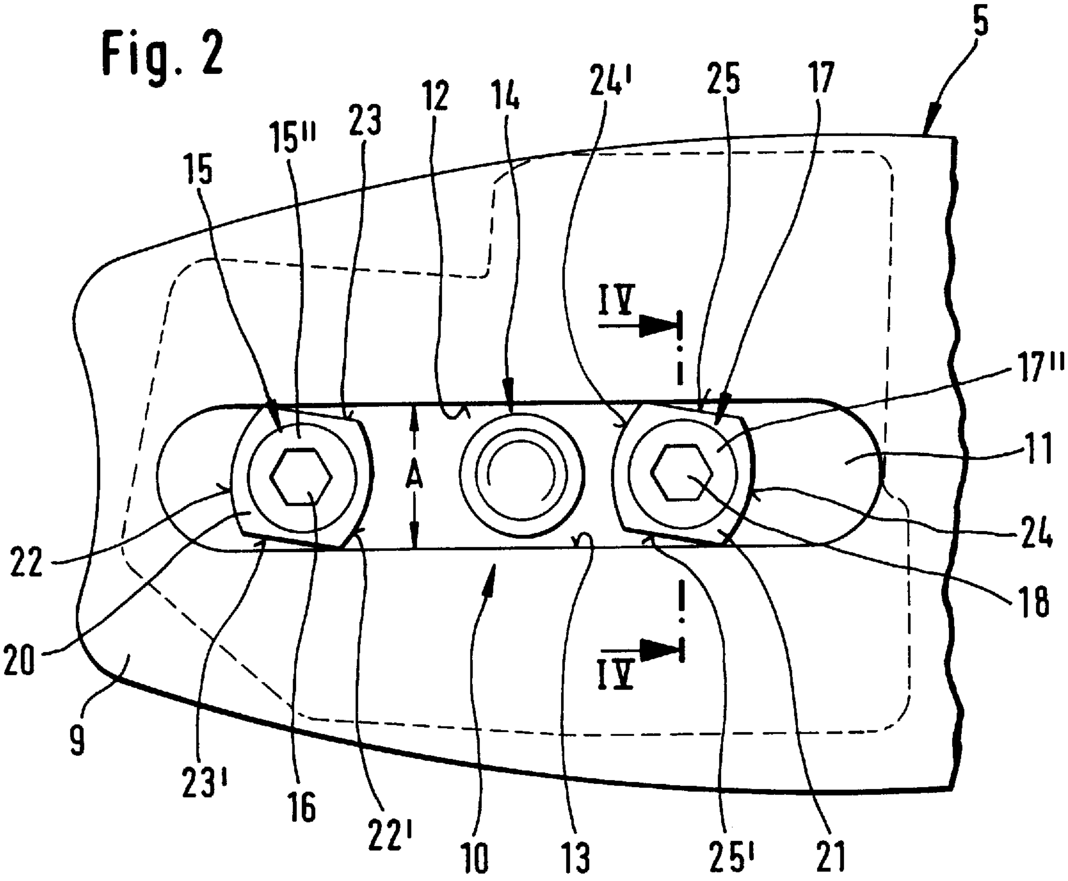
FIG. 2 shows that end of the guide bar that is to be secured to the housing along with one exemplary embodiment of the inventive mounting mechanism.

FIG. 2 is an enlarged view of the rear end 9 of the guide bar 5 as well as of the mounting and securing mechanism 10. Provided in the rear end 9 of the guide bar 5 is an elongated opening 11 that extends in the longitudinal direction of the guide bar and which has two parallel longitudinal edges 12 and 13. Disposed in this elongated opening 11 is a central bolt 14 as well as two screws 15 and 17 that also serve as bolts and that are disposed at different distances from the central bolt 14. The plan view of the screws 15 and 17 of FIG. 2 shows the heads 15" and 17", in each of which is provided a respective hexagonal recess (Allen head) 16 or 18. The Allen head 16, 18 serves for receiving a key or Allen wrench for turning the screws 15, 17.

Disposed in the elongated opening 11 is a sleeve or collar 20 that surrounds the head 15" of the screw 15, as well as a sleeve or collar 21 that surrounds the head 17" of the screw 17. These collars 20, 21 have the same cross-sectional shapes, whereby the cross-sectional shape of the collar 20 comprises two arcs 22, 22" and two chords 23, 23' of the circle. The cross-sectional shape of the collar 21 is formed from two arcs 24, 24' and two chords 25, 25'. As a consequence of this cross-sectional shape, at least one of the dimensions of the collars 20, 21 is greater than the spacing A between the parallel longitudinal edges 12 and 13 of the elongated opening 11. By rotating the collars 20, 21 about the longitudinal axis, each of the collars 20, 21 can be brought into contact not only with the longitudinal edge 12 but also with the longitudinal edge 13 of the elongated opening 11.

Figure 3:
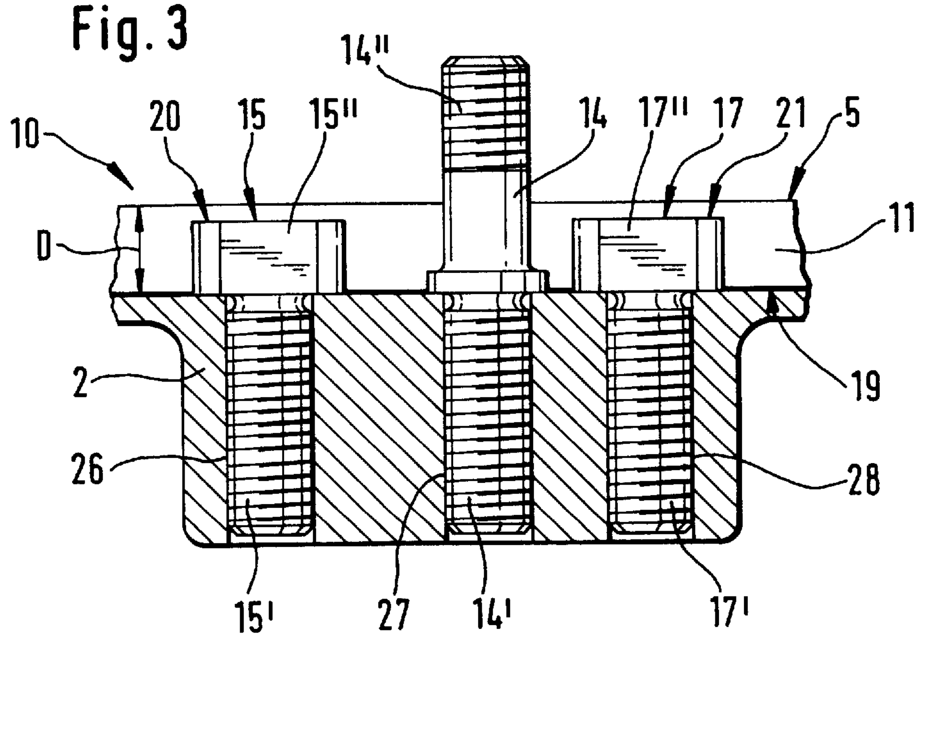
FIG. 3 is a longitudinal cross-sectional view through the arrangement of FIG. 2 with the bolts received therein.

FIG. 3 shows a longitudinal cross-sectional view through the mounting mechanism 10, whereby a securing means that can be screwed onto a threaded portion 14" of the bolt 14, and which fixes the guide bar 5 against an abutment surface 19 of the housing 2, has been omitted from the drawing. Provided in the housing 2 are threaded bores 26, 27, 28 for respectively receiving a threaded shaft 14', 15', 17' of the bolts and screws. The collar 20 is disposed on the screw head 15", with the respective upper edges of the head 15" and of the collar 20 being flush with one another. The configuration of the collar 21 and the head 17" of the screws 17 are comparable to this, so that these components are also flush with one another. Since the thickness D of the guide bar 5 is somewhat greater than the axial length of the collars 20, 21, the heads 15", 17" of the screws 15, 17, and the collars 20, 21, therefore do not project beyond the upper edge of the guide bar 5. Pursuant to an alternative embodiment, the central bolt can be used in place of one of the lateral bolts, so that altogether only two bolts are provided, one of which is embodied as a screw having a collar.

Figure 4:
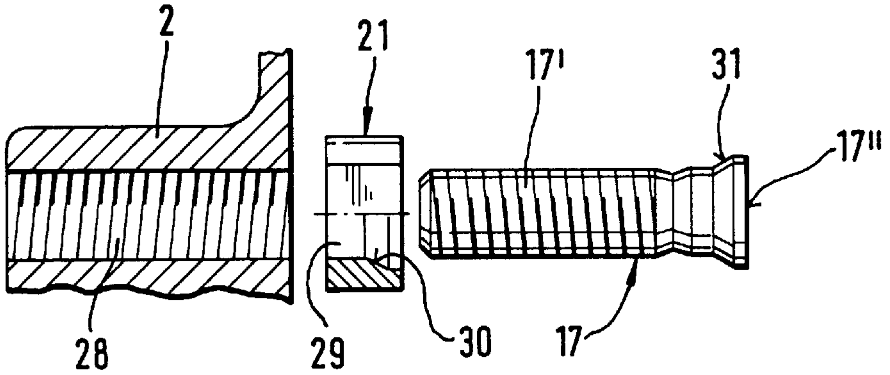
FIG. 4 is an exploded view of a bolt, collar and the housing taken along the line IV—IV in FIG. 2.

FIG. 4 is an exploded view of the screw 17, the collar 21, and that portion of housing 2 in which the threaded bore 28 is disposed. From the illustration of FIG. 4 it can be seen that a stepped bore 29 is provided in the collar 21, whereby a conical portion 30 is provided between the two steps of the bore. The screw head 17" is also provided with a conical portion 31 that has the same conical angle and thus serves as a cooperating cone for the conical portion 30 that is provided in the bore 29. In this manner, when the two conical portions rest against one another, a frictional connection results between the screw 17 and the collar 21, so that when the screw 17 is tightened, the collar 21 is carried along until the collar 21 rests against the longitudinal edges 12 and 13 of the elongated opening 11, as shown in FIG. 2.

Alternatively, it is also possible to provide a smooth-walled bore in the housing 2 through which extends a shaft of the screw, whereby one end of the screw has a head and the other end has a threaded portion. By means of this threaded portion the screw can be rotatable in a threaded bore of the collar.

Figure 5:
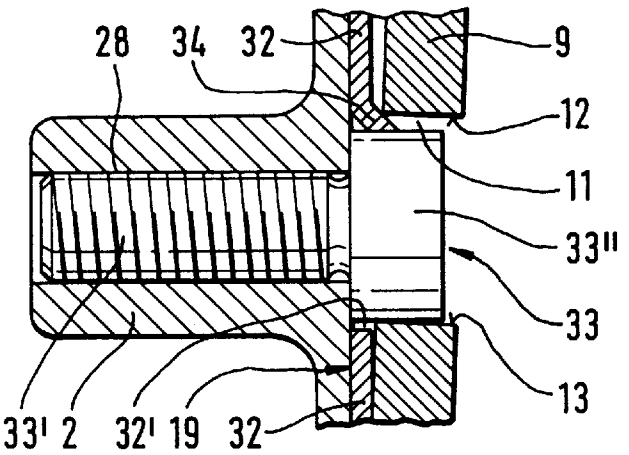
FIG. 5 is a cross-sectional view through another exemplary embodiment of an inventive mounting mechanism with a plate section for compensating for tolerance.

FIG. 5 is an enlarged view of a further exemplary embodiment of the present invention; in this embodiment, a bolt 33 is rotated into the threaded bore 28 of the housing 2 via the threaded shaft 33' of the bolt. The bolt 33 furthermore has a head 33" having smooth walls in the axial direction. A metal plate 32 is disposed against the abutment surface 19 of the housing 2, and the metal plate is provided with an opening 32' through which the head 33" of the bolt 33 extends. At the rim of the opening 32', a metal plate 32 is provided with a bent-away section 34 that extends at an acute angle relative to the longitudinal axis of the bolt 33 and rests against the side surface of the bolt head 33". As a consequence of this configuration, when the end 9 of the guide bar 5 is pressed against the metal plate 32, the end 9 is displaced by the inclined section 34 transverse to the longitudinal axis of the bolt 33 until the longitudinal edge 13 of the elongated opening 11 rests against the bolt head 33". The longitudinal edge 12 of the end 9 of the guide bar 5 is supported against the section 34, so that there is no play available for a movement directed transverse to the longitudinal axis of the bolt 33. Although only one section 34 is shown in FIG. 5, it is to be understood that two or more sections could also be provided.

Figure 6:
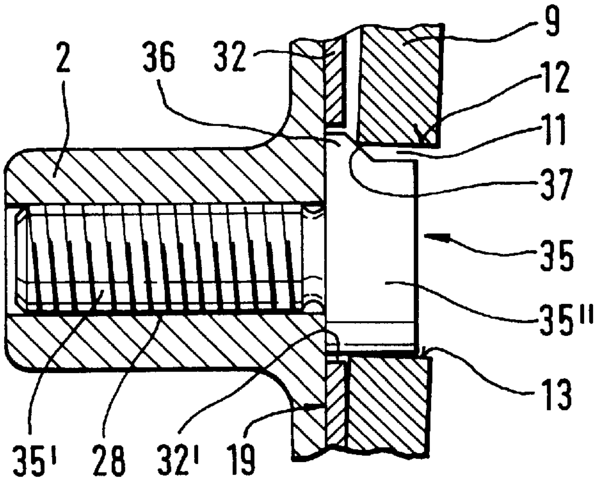
FIG. 6 is a cross-sectional view through a modified mounting mechanism having compensating means formed on a bolt head.

A variation of the embodiment of FIG. 5 is illustrated in FIG. 6. In this embodiment, a bolt 35 is shown, the threaded shaft 35' of which is received in the threaded bore 28, and the head 35" of which is provided on at least one portion of its periphery with a radially widened portion 36 that is provided with a surface 37 that extends at an angle to the longitudinal axis of the bolt 35. This inclined surface 37 performs the same function as does the inclined section 34 in FIG. 5, whereby reference is made to the foregoing description of such function. Two or more widened portions 36 could be provided. Furthermore, instead of the bolt head 35", a correspondingly shaped collar having a bolt shaft or threaded section disposed inwardly of the collar could also be provided.

It is to be understood that the angle shown in FIGS. 5 and 6 between the metal plate 32 and the rear end 9 of the guide bar 5 is exaggerated in order to explain the functioning of the inventive mounting mechanism. In actuality, when the guide bar is mounted and secured, the guide bar rests against the metal plate 32 on both sides of the bolt head 33" or 35".

Figure 7:
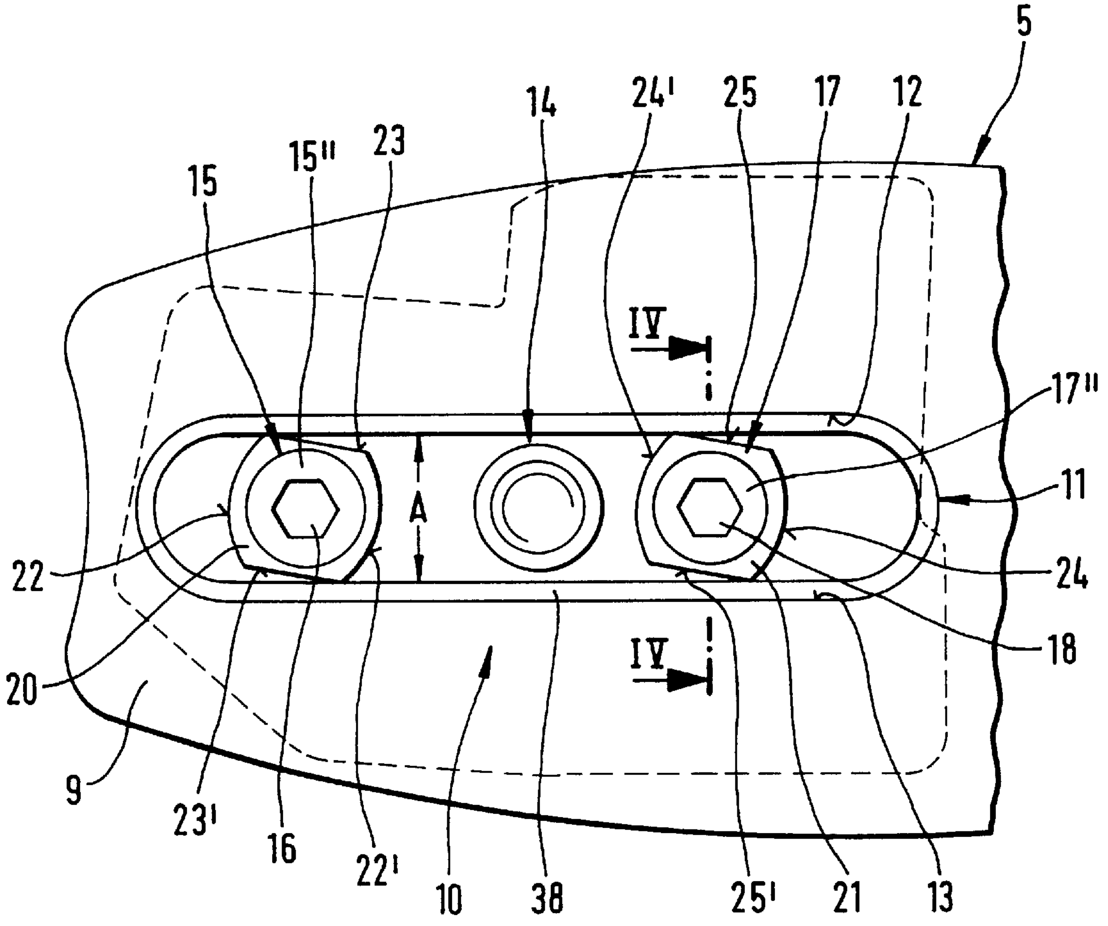
FIG. 7 is a modification of the embodiment of FIG. 2 with a guide element.

Pursuant to the further exemplary embodiment illustrated in FIG. 7, a molded part in the form of the guide element 38 is disposed in the elongated opening 11; a bolt 14 projects into this guide element 38. With an appropriate length two bolts or screws 15, 17 can also extend into or pass through the guide element 38. The peripheral surface of the guide element 38 is provided with at least one abutment for the longitudinal edges 12, 13 of the elongated opening 11; however, a number of such abutments can also be provided. For this purpose, inclined surfaces can also be provided. Identical components are provided with the same reference symbols in FIG. 7 as they are in FIG. 2.

The specification incorporates by reference the disclosure of German priority document 298 12 098.4 of Jul. 8 1998.

The present invention is, of course, in no way restricted to the specific disclosure of the specification and drawings, but also encompasses any modifications within the scope of the appended claims.

What is claimed is:

1. A mounting mechanism for an adjustable component that is to be held against an abutment surface of a housing, comprising:

at least two bolts that are provided on said housing, are spaced from one another, and project beyond said abutment surface and into an elongated opening of said component, wherein said elongated opening has two longitudinal edges, and at least one means for compensating dimensional tolerances of said elongated opening of said component that extends into a gap between one of said bolts and at least one of said longitudinal edges of said elongated opening for engaging said at least one longitudinal edge.

2. A mounting mechanism according to claim 1, wherein each of said bolts has a threaded shaft and said housing has a threaded bore into which said threaded shaft is screwed.

3. A mounting mechanism according to claim 2, wherein each of said at least one means is a collar that is disposed in said elongated opening, and wherein said means has an outer cross-sectional configuration with at least one dimension that is greater than a width A of said elongated opening.

4. A mounting mechanism according to claim 3, wherein each said collar has a outer surface formed from two circular arc sections and two parallel cords of such a circle.

5. A mounting mechanism according to claim 4, wherein said two arc sections have the same radius.

6. A mounting mechanism according to claim 3, wherein each said collar has an outer surface comprised of arc sections of different curvature.

7. A mounting mechanism according to claim 3, wherein said means that extends into a gap is disposed on a peripheral surface or radial shoulder of said bolt.

8. A mounting mechanism according to claim 3, which includes further means for establishing a positive connection between said bolt and said collar in a direction of rotation of said bolt.

9. A mounting mechanism according to claim 8, wherein a respective conical section is provided in a bore of said collar and on said bolt wherein conical angles of said conical sections are coordinated with one another.

10. A mounting mechanism according to claim 9, wherein said conical section on said bolt is formed on a head of said bolt, and wherein an axial length of said bolt head corresponds approximately to an axial length of said collar.

11. A mounting mechanism according to claim 3, wherein said bolt extends through said bore in said housing and engages said collar via a threaded section, and wherein a head of said bolt is disposed on an end of said bore that is remote from said collar.

12. A mounting mechanism according to claim 3, wherein said collar is made from very hard carbon steel.

13. A mounting mechanism according to claim 11, wherein an internal actuating means is disposed in said head of said bolt.

14. A mounting mechanism according to claim 1, wherein a metal plate is provided on said abutment surface of said housing for supporting said component, and wherein said metal plate is provided with an opening through which said bolt or a head thereof extends.

15. A mounting mechanism according to claim 14, wherein a rim of said opening of said metal plate is provided with a section that extends at an angle to a longitudinal axis of said bolt.

16. A mounting mechanism according to claim 14, wherein a head of said bolt has an essentially circular cross-sectional configuration and is provided on an outer surface thereof with a radially widened portion having a surface that extends at an angle to a longitudinal axis of said bolt.

17. A mounting mechanism according to claim 1, wherein a guide element is disposed in said elongated opening with at least one of said bolts projecting into said guide element, and wherein said guide element has at least one surface for abutment against at least one of said longitudinal edges of said elongated opening.

* * * * *